Aug. 28, 1962    S. ZECHTER ETAL    3,051,900
IN-CIRCUIT TRANSISTOR TESTER
Filed May 8, 1959    2 Sheets-Sheet 1

INVENTORS
SOL ZECHTER
HAROLD GRUEN
BY
Robert D. Sanborn
ATTORNEY

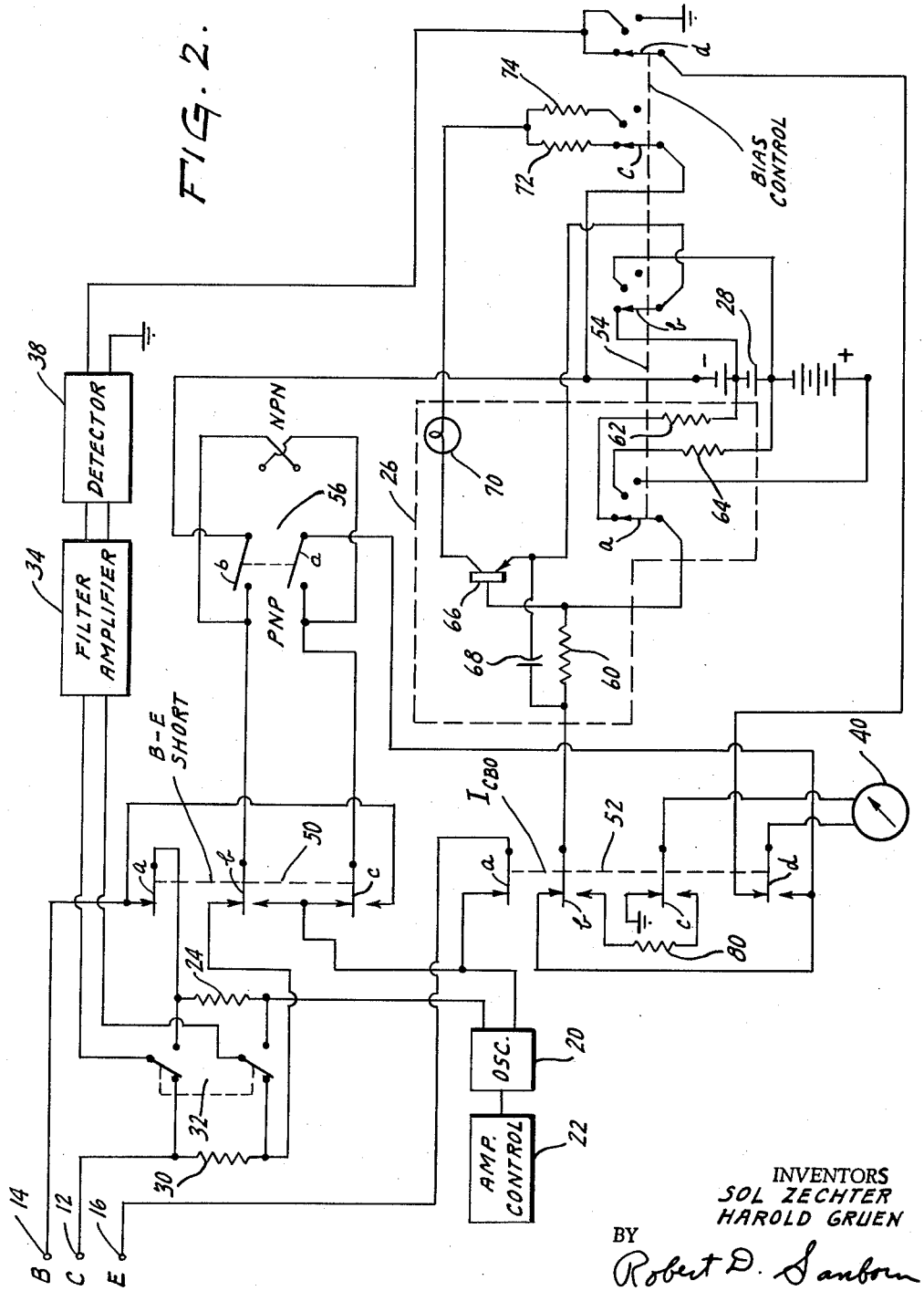

United States Patent Office 3,051,900
Patented Aug. 28, 1962

3,051,900
IN-CIRCUIT TRANSISTOR TESTER
Sol Zechter, Broomall, and Harold Gruen, Elkins Park, Pa., assignors, by mesne assignments, to Philco Corporation, Philadelphia, Pa., a corporation of Delaware
Filed May 8, 1959, Ser. No. 811,842
13 Claims. (Cl. 324—158)

The present invention relates to testing circuits and more particularly to means for testing transistors while connected in amplifier circuits or the like.

For reasons which do not require elaboration here it is common practice to solder transistors directly to printed wiring boards or the like. This practice has the disadvantage that if the circuit including the transistor is faulty in some respect it is often difficult to determine with conventional testing means whether the fault lies in the transistor or in some other element of the circuit. Experience has shown that it is impractical to attempt to unsolder the transistors from the circuit to test them. The heat conducted to the transistor element by way of the leads during the unsoldering and resoldering operation frequently destroys the transistor even though it may have been fault-free before it was unsoldered from the circuit. As a result, servicing and repair of printed wiring boards and other circuit assemblies employing soldered-in transistors is difficult, time consuming, and expensive and usually results in the destruction of many fault-free elements.

The copending application of John Forrest Bigelow, Serial No. 774,966, filed November 19, 1958, now Patent 2,922,954, issued June 26, 1960, discloses and claims a circuit for testing transistors while connected in the circuit. The transistor test set disclosed and claimed in said copending application connects the transistor under test in a common base amplifier circuit in which the source impedance and the load impedance are low compared to the existing circuit impedances connected to the transistor under test. The condition of the transistor is determined by determining the waveshape of the signal appearing across the load impedance of the test set and by measuring the direct current flowing at selected points in the test circuit. In general an oscilloscope or some equivalent means is required for determining the waveshape of the signal across the load impedance of the test circuit. This requirement makes the test set less portable and somewhat more complex in its operation than is desired in many instances. It is not possible to substitute simple signal amplitude measuring devices for the signal waveshape display devices in the circuits of the prior art for the reason that the circuits normally associated with the transistor under test provide sneak paths, that is paths which bypass the transistor, for both direct and alternating currents. Currents flowing in these sneak paths and bypassing the transistor would cause erroneous readings of a signal amplitude measuring means in the output circuit of the test set. These sneak paths have made the direct in-circuit measurement of the beta of a transistor by prior art means subject to considerable error.

Therefore it is an object of the present invention to provide an in-circuit transistor tester which does not require a determination of signal waveshape for its operation.

It is a further object of the present invention to provide an in-circuit transistor tester in which the output data is displayed on a simple meter circuit.

It is another object of the present invention to provide an improved in-circuit transistor tester which will permit direct measurement of the beta of the transistor.

It is a further object of the present invention to provide an improved in-circuit transistor tester which is relatively free of errors due to sneak paths and shunting effect of components connected to the transistor in the circuit under test.

Still another object of the present invention is to provide an improved in-circuit transistor tester which will provide indications of various faults which may occur in transistors and the circuit elements associated therewith.

In general these and other objects of the present invention are achieved by providing a test circuit which supplies energy to the transistor at one frequency and which monitors the input and output currents of the transistor at a harmonic of the frequency of the supplied energy.

For a better understanding of the present invention together with other and further objects thereof reference should now be had to the following detailed description which is to be read in conjunction with the accompanying drawings in which:

FIG. 2 is a more detailed diagram, partly in schematic form, of an embodiment of the invention similar to the one shown in FIG. 1;

Figure 1:
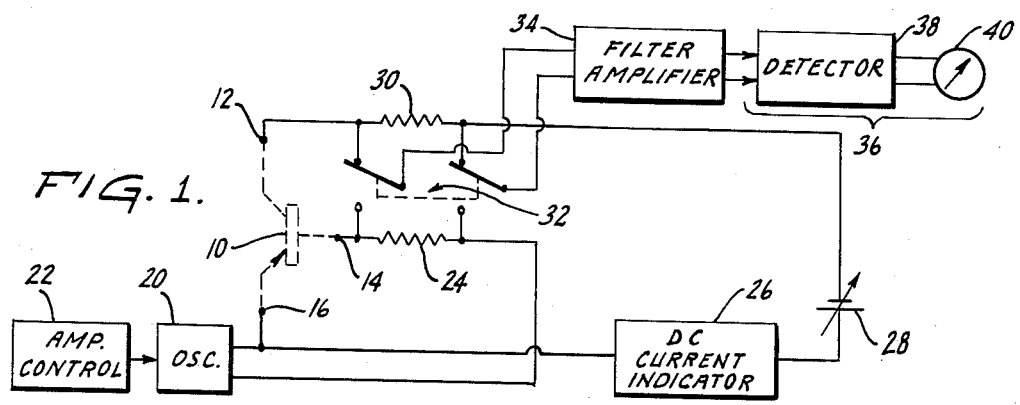
FIG. 1 is a diagram, partially in block form, of one preferred embodiment of the present invention.

In FIG. 1 the transistor under test is shown in broken lines at 10. Only the transistor 10 has been shown in FIG. 1 but it is to be understood that usually there will be other circuit elements associated with transistor 10 to form a circuit such as an amplifier circuit, an oscillator circuit or the like. The circuit about to be described will check transistor 10 while it is still connected in its normal circuit. Suitable connector means schematically represented by terminals 12, 14 and 16 are provided for connecting the test set to the collector, the base and the emitter, respectively, of the transistor under test. The connector means may be spring clips, test probes or the like. If the test set is to be employed for checking various types of transistor circuits, the connector means 12, 14 and 16 may be individually attachable so as to conform to different circuit configurations. If the test circuit is to be employed to check one type of circuit only, a suitable holder means may be provided for the three connector means 12, 14 and 16 so that connections to all three elements of the transistor may be made in one operation. Suitable means may be provided in addition to the probes and clips employed for in-circuit measurement to accommodate transistors which are not connected in any circuit.

The test circuit per se comprises an oscillator 20 which is provided with an amplitude control circuit 22. Oscillator 20 may be any convenient form of sinusoidal oscillator which provides signals at a proper frequency for testing the transistor 10. A test frequency of 1,000 cycles per second has been found to be satisfactory in most instances. For reasons which will appear presently it is desirable that the output signal from oscillator 20 be relatively free of harmonic components. The amplitude control 22 associated with oscillator 20 may take the form of a variable attenuator connected to the output of the oscillator 20. Another preferred form of amplitude control comprises an adjustable feedback circuit in the oscillator 20 which controls directly the amplitude of the signal generated by oscillator 20. In test circuits for making precision measurements, amplitude control 22 may provide both a coarse and a vernier control of the amplitude of the output signal from oscillator 20. It is desirable that oscillator 20 have a relatively low D.C. impedance between its output terminals and also a low equivalent source impedance. This source impedance should be low compared to the circuits normally connected between the base and the emitter of the transmitter 10 in the circuit under test.

One output terminal of the oscillator is connected directly to the emitter connector means 16. The other output terminal of oscillator 20 is connected through a base current metering resistor 24 to base connector means 14. The emitter connector means 16 is connected through a direct current indicating circuit 26 to the positive terminal of a bias potential source 28. Source 28 may include means for selecting the bias potential supplied thereby to provide a suitable emitter-to-collector bias voltage for each type of transistor to be tested. Direct current indicating circuit 26 provides an indication if the average current exceeds a preselected value. One preferred form of indicating circuit is shown in detail in FIG. 2. Indicating circuit 26 is bypassed for alternating current signals so that, for alternating current signals, emitter connecter means 16 is coupled directly to the positive terminal of bias source 28.

The collector connector means 12 is connected through a collector current metering resistor 30 to the negative terminal of bias source 28. A double pole, double throw switch 32 is provided for connecting the input of a filter amplifier 34, selectively, across resistor 30 or across resistor 24. In accordance with a feature of the present invention, filter amplifier 34 has a restricted passband centered at a harmonic of the frequency generated by oscillator 20. In the preferred embodiment of the invention filter amplifier 34 has a passband which will pass the second harmonic only of the signal supplied by oscillator 20 and exclude the fundamental component of the signal supplied by oscillator 20.

The output of amplifier 34 is supplied to a suitable indicator circuit 36. The indicator 36 comprises a detector or rectifier circuit 38 and a meter 40. Meter 40 indicates, selectively, the base current or the collector current of the transistor under test. Since the collector current will normally be several times larger than the base current, it is desirable to include means for changing the sensitivity of meter 40. In one preferred embodiment of the invention this is accomplished by making the resistance of resistor 24 ten times the resistance of resistor 30. Suitable signal gain control means (not shown) may be included in amplifier 34, detector 38 and/or meter 40 for the purpose of calibrating the measuring circuit. Further again control means for changing by a selected factor the scale of readings on meter 40 may be included if desired. Suitable means may be provided for changing the ratio of the resistances of resistors 24 and 30 to change the range of betas which may be measured.

The system shown in FIG. 1 operates in the following manner. It is assumed that the transistor 10 is a PNP type. If an emitter-to-collector short circuit exists in transistor 10 or in the circuits associated therewith a large current will flow through direct current indicating circuit 26 which will provide a suitable indication of the magnitude of the current. Assuming no short circuits exist in the circuit under test the bias source 28 biases the transistor 10 for class B operation. Therefore base current and emitter current will flow only during the negative half cycles of the signal from oscillator 20. The approximately half wave rectified base current will contain a second harmonic component which is proportional to the amplitude of the signal supplied by oscillator 20. The collector current flowing through resistor 30 will contain a second harmonic component which has an amplitude equal to the amplitude of the second harmonic component of the base current multiplied by the beta of the transistor. In the preferred embodiment of the invention the metering circuit including amplifier 34 and indicator 36 has a sensitivity such that meter 40 reads full scale with a preselected amplitude of second harmonic current flowing through resistor 30. A value of one milliampere of average current is satisfactory for many types of transistors now in commercial use.

The oscillator amplitude control circuit 22 is adjusted so that the oscillatory base current signal supplied to transistor 10 is of sufficient amplitude to cause the collector current through resistor 30 to be at at the selected value as indicated by the full scale deflection of meter 40. Switch 32 is then thrown to connect the input of filter amplifier 34 across resistor 24 to measure the current flowing through this resistor. Since, in the preferred embodiment of the invention, the collector current is held constant for each test, the beta of the transistor under test will be inversely proportional to the deflection of meter 40. Therefore the scale of meter 40 is preferably calibrated to read the beta directly. To take a specific example in which it is assumed that the amplifier 34, detector 38 and meter 40 taken together have a linear amplitude response, if resistor 24 has a resistance ten times that of resistor 30, a transistor having a beta of 10 will require a base current such as to cause meter 10 to have full scale deflection as switch 32 is thrown to the down position. A transistor having a beta of 20 will cause meter 40 to deflect to one-half of full scale. Similarly a transistor having a beta of 100 will result in a deflection which is 1/10 full scale.

It will be seen that, in accordance with a feature of the present invention, the beta measurement is made solely with the second harmonic component of the signal supplied by oscillator 20. If the circuit components normally associated with the transistor under test are linear circuit elements, the voltage at the fundamental frequency at the output of oscillator 20 will induce only currents at the fundamental frequency in resistor 30 by way of the sneak paths in the circuit under test. The signals at the fundamental frequency appearing across resistor 30 will be rejected by the bandpass characteristic of filter amplifier 34 and hence will not affect the accuracy of the measurement. The second harmonic component appearing across resistor 30 is derived directly from the second harmonic component generated by the base-to-emitter diode of the transistor under test. While any second harmonic component in the output of the oscillator may be coupled to resistor 30 by way of sneak paths in the circuit under test, the errors from this source may be held at an arbitrary low value by proper filtering of the oscillator output and by employing an oscillator with a low equivalent source impedance compared to the impedances in the circuit under test.

A single meter circuit for measuring both base and collector current has been shown in FIG. 1. It lies within the scope of the invention to provide separate meter circuits for base and collector currents. Similarly, the beta of the transistor may be determined for any arbitrary setting of the amplitude control 22—that is, any arbitrary values of base and collector currents, by measuring by any appropriate means the amplitude of the second harmonic components of the collector current and base current which flow, respectively, through resistors 24 and 30, and then computing the ratio of these currents.

FIG. 2 shows a preferred form of in-circuit transistor tester arranged in accordance with the block diagram of FIG. 1. The circuit shown in FIG. 2 includes, in addition to the features of FIG. 1, means for reversing the voltage of the bias source to permit testing of either PNP or NPN transistors, means for checking for base-to-emitter short circuits and means for measuring the $I_{CBO}$ of the transistor under test. $I_{CBO}$ is the collector current flowing in the collector circuit with a specified base-to-collector bias and the emitter open circuited. This parameter is also identified by the symbol $I_{CO}$. Parts in FIG. 2 corresponding to like parts in FIG. 1 have been identified by the same reference numerals.

The circuit of FIG. 2 includes three multiblade switches 50, 52 and 54 for changing connections within the meter circuit. It also includes a reversing switch 56 for reversing the polarity of the bias voltage supplied between the collector and emitter terminals 12 and 16, respectively. Switch 50 is a three-blade, two-position switch having three normally closed contacts and two normally open contacts. In the following description the three blades of switch 50 are identified by the reference letters $a$, $b$ and $c$, respectively. Similar reference letters are applied to the respective blades of the other switches. As will be explained in more detail later, switch 50 is thrown to the down position in order to check for base-to-emitter short circuits.

Switch 52 is a four-blade, two-position switch having four normally closed contacts and three normally open contacts. This switch is thrown to its down position to measure the $I_{CBO}$ of the transistor under test.

Switch 54 is a four-blade, three-position switch which is employed to change the value of direct bias potential supplied to the transistor. All of the switches are shown in the position for measuring the beta of a PNP transistor at the lowest value of bias voltage available from the test circuit.

With the four switches 50, 52, 54 and 56 in the position shown in FIG. 2 it will be seen that the base connector means 14 is connected through the $a$ blade of switch 50 and resistor 24 to one terminal of oscillator 20. The other terminal of oscillator 20 is connected though the $a$ blade of switch 52 to emitter connector means 16. The emitter connector means 16 is also connected through the $c$ blade of switch 50, the $a$ blade of reversing switch 56, the $b$ blade of switch 52, the resistor 60 in the direct current indicating circuit 26 and the $a$ blade of switch 54 to the selected positive tap on bias source 28. The negative terminal of bias source 28 is connected through the $b$ blade of switch 56 and the $b$ blade of switch 50 to one terminal of the collector load resistor 30. The other terminal of collector load resistor 30 is connected to the collector connector means 12. It will be seen that the connection just traced is identical to the circuit shown in FIG. 1. It will be seen also that changing the setting switch 54 will cause the bias potential supplied between the collector and emitter terminals to increase.

The direct current indicating circuit 26 comprises resistor 60 which is placed in series with resistor 62 or resistor 64 by the $a$ blade of switch 54. Resistors 60, 62 and 64 have a resistance which is much larger than that of resistor 30. The junction of resistor 60 and resistor 62 or 64 is connected to the base of a transistor 66. The emitter of transistor 66 is connected to the other terminal of the selected resistor 62 or resistor 64 through the $b$ blade of switch 54. The signal appearing across resistor 62 or 64, whichever is in circuit with resistor 60, forms the base-to-emitter input signal for transistor 66. Resistor 64 has a lower impedance than resistor 62 so that switching to a higher bias supply voltage does not increase the signal appearing between base and collector of transistor 66 if a short circuit is present between emitter and collector. A capacitor 68 bypasses both resistor 60 and the resistor 62 or 64 in circuit therewith for signals at the frequencies supplied by oscillator 20 and for signals at the second harmonic of this frequency. An indicator lamp 70 is connected in series with the collector of transistor 66. The other terminal of lamp 70 is connected through a limiting resistor 72 or 74 to the negative terminal of bias source 28. The limiting resistor is selected by the $c$ blade on switch 54. An emitter-to-collector short circuit will cause a relatively high current to flow through resistor 62 or 64. This will turn transistor 66 on and cause lamp 70 to light.

To check for a base-to-emitter short circuit switch 50 is thrown to the down position as shown in FIG. 2. This disconnects the base connector means 14 from resistor 24 and oscillator 20 and connects it directly to one terminal of resistor 60 through the blade $c$ of switch 50, blade $a$ of switch 56 and blade $b$ of switch 52. Blade $b$ on switch 50 connects the emitter connector means 16 to the negative terminal of bias source 28 through blade $b$ of switch 56.

Figure 3:
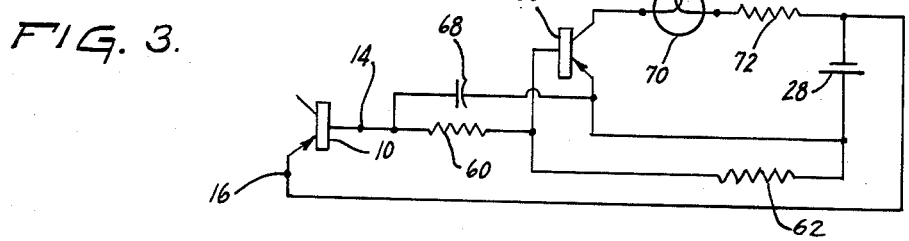
FIG. 3 is a simplified schematic diagram of the embodiment of FIG. 2 when set to check for base-to-emitter short circuits in PNP transistors.

The equivalent circuit of the embodiment of FIG. 2 with switch 50 in the down position is shown at FIG. 3. Parts in FIG. 3 corresponding to like parts in FIG. 2 have been identified by the same reference numerals. It will be seen that bias source 28 back biases the emitter-to-base diode of transistor 10. Hence no current will flow through resistor 60 and resistor 62 if there is no short circuit between the emitter and base of transistor 10. In the event that a short circuit exists between the base and emitter circuits of transistor 10, either in the transistor itself or in some external circuit, a direct connection will exist between emitter connection means 16 and base connector means 14. As a result a relatively large current will flow through resistor 60 and resistor 62. The voltage developed across resistor 62 as a result of this current flow will be in a direction to turn transistor 66 on and light lamp 70.

Figure 4:
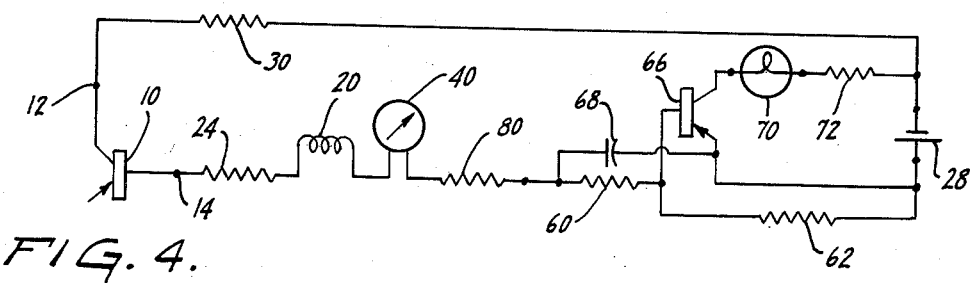
FIG. 4 is a simplified schematic diagram of the embodiment of FIG. 2 when set to measure $I_{CBO}$ for PNP transistors.

In measuring $I_{CBO}$ it is generally necessary to remove the transistor from the circuit since the $I_{CBO}$ of a transistor is generally of the order of a few microamperes. This is of the same order of magnitude or in some cases less than the currents between base and collector through the sneak paths of the circuit under test. To measure the $I_{CBO}$ of a transistor, switch 50 is restored to the up position and switch 52 is thrown to the down position. Blade $a$ of switch 52 opens the emitter circuit by disconnecting emitter connector means 16 from the remainder of the circuit. Blade $d$ disconnects one terminal of meter 40 from the output of detector 38 and connects it to the base connector means 14 through blade $a$ of switch 56, blade $c$ of switch 50, the oscillator circuit 20, resistor 24 and blade $a$ of switch 50. Blade $c$ of switch 52 disconnects the other terminal of meter 40 from ground and connects it through multiplying resistor 80 and blade $b$ of switch 52 to one terminal of resistor 60. The equivalent circuit of the connections just described is shown in FIG. 4. Parts in FIG. 4 corresponding to like parts in FIG. 2 have been identified by the same reference numerals. The value of resistor 80 may be selected so that meter 40 reads directly in microamperes or milliamperes.

It will be noted that on the third position of switch 54, the direct current indicating circuit 26 is rendered inoperative by blades $b$ and $c$ of switch 54. The removal of resistors 62 and 64 from the multiplier network of meter 40 will not substantially affect the calibration of the meter scale. In one preferred embodiment of the invention resistor 80 has a value of 47,000 ohms, resistor 62 a value of 120 ohms and resistor 64 a value of 47 ohms.

Figure 5:
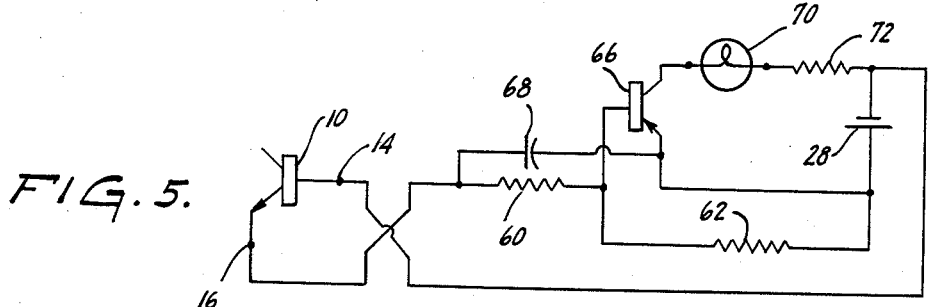
FIG. 5 is a diagram similar to FIG. 3 showing the circuit for checking for base-to-emitter short circuits in NPN transistors.

FIG. 5 is an equivalent circuit similar to FIG. 3 but with the switch 56 thrown to the right to the NPN position. It will be seen from FIG. 5 that no change is made in the direct current indicating circuit 26. However the base connector means 14 is now connected directly to the negative terminal of bias source 28 and the emitter connector means 16 is connected to one end of resistor 60. While the reversal of switch 56 has been shown only for the condition that switch 50 is in position to measure base-to-emitter short circuits, it is to be understood that switch 56 will be in the NPN position whenever an NPN transistor is being tested. That is, it will be in the right-hand position for measuring beta or $I_{CBO}$.

With the circuit shown in FIG. 2 beta measurements will be made with switch 54 in the position shown or in the next clockwise position. Base-to-emitter short circuits will be checked with switch 54 in the two positions mentioned above. The positions chosen for measuring beta or checking for short circuits should be such that the rated collector-to-emitter bias of the transistor under test is not exceeded. The value of $I_{CBO}$ for certain types of transistors is extremely small at a base-to-collector bias equal to the normal collector-to-emitter bias applied to the transistor. Therefore switch 54 is provided with a third position which provides a relatively high base-to-collector bias for $I_{CBO}$ measurements.

Bias source 28 may be provided with additional taps and switch 54 with additional positions to permit a wider selection of emitter-to-collector biases for the transistor under test. Switch 54 may also be provided with additional positions which permit the bias source 28 to be entirely disconnected from the circuit when the test circuit is not in use. It may be provided with further positions in which meter 40 is connected across the bias source 28 in order to check the value of the bias voltage being supplied.

It will be seen from the foregoing description of the invention that filter amplifier 34 does not respond to signals at the frequency supplied by oscillator 20. If oscillator 20 provides a signal having no appreciable harmonic components, amplifier 34 may have a high pass characteristic rather than a band-pass characteristic.

While the invention has been described with reference to a single embodiment thereof, it will be apparent that various modifications and other embodiments thereof will occur to those skilled in the art within the scope of the invention. Accordingly we desire the scope of our invention to be limited only by the appended claims.

What is claimed is:

1. A transistor test circuit comprising means adapted to be coupled to the emitter and collector of the transistor to be tested for biasing the transistor to be tested for essentially class B operation, means adapted to be coupled to the base and emitter of the transistor to be tested for supplying a signal at a first frequency to the base-emitter circuit of said transistor and means adapted to be coupled to the transistor to be tested and substantially non-responsive to signals at said first frequency for measuring the amplitude of a component of the collector current and a component of the base current of said transistor which have a second frequency which is a multiple of said first frequency.

2. A transistor test circuit in accordance with claim 1 wherein said second frequency is an even multiple of said first frequency.

3. A transistor test circuit in accordance with claim 1 wherein said second frequency is twice said first frequency.

4. A transistor test circuit comprising a source of direct bias voltage, a first metering impedance connected in series circuit with said source of bias voltage, means for connecting said series circuit between the emitter and collector of the transistor to be tested, an oscillatory signal source for providing signals at a first frequency, a second metering impedance connected in series circuit with said oscillatory signal source, means coupling said last-mentioned series circuit between the emitter and base of the said transistor to be tested thereby to bias the transistor to be tested for essentially class B operation and means substantially non-responsive to signals at said first frequency for measuring the amplitudes of the signal components appearing across said first and second metering impedances which are at a frequency equal to a multiple of said first frequency.

5. A transistor test circuit in accordance with claim 4 wherein said last-mentioned measuring means is responsive only to signal components having frequencies equal to even multiples of said first frequency.

6. A transistor test circuit in accordance with claim 4 wherein said last-mentioned measuring means is responsive only to signal components having frequencies equal to twice said first frequency.

7. A transistor test circuit in accordance with claim 4 wherein said means for measuring the amplitudes of said signal components comprises a filter amplifier circuit, a meter circuit for measuring the amplitude of the signal passed by said filter amplifier circuit and means for connecting the input of said filter amplifier circuit selectively across said first metering impedance or said second metering impedance.

8. A transistor test circuit in accordance with claim 4, said test circuit further comprising means connected in the emitter-collector circuit of said transistor under test for indicating the presence of excessive current flow in said emitter-collector circuit.

9. A transistor test circuit in accordance with claim 8 wherein said means for indicating excessive current flow comprises a direct current indicating circuit connected in series with said first named series circuit.

10. A transistor test circuit comprising a first metering impedance, a source of direct bias potential, and a second metering impedance, said two impedances and said source being connected in a first series circuit, means for connecting one end of said first series circuit to the collector and the other end of said series circuit to the emitter of the transistor to be tested for alternating and direct signals, a source of oscillatory signals providing signals at a first frequency, a third metering impedance connected in series circuit with said source of oscillatory signals to form a second series circuit, means for coupling one end of said second series circuit to the base and the other end of said second series circuit to the emitter of the transistor to be tested thereby to bias the transistor to be tested for essentially class B operation, a first metering circuit substantially non-responsive to signals at said first frequency for measuring the amplitudes of signal components appearing across said first and third metering impedances which are at a frequency equal to a multiple of said first frequency and a second metering circuit for indicating the magnitude of the direct current flowing through said second metering impedance.

11. A test circuit in accordance with claim 10 wherein said first metering circuit comprises a filter amplifier circuit, a meter circuit for registering the amplitude of the signal passed by said filter amplifier circuit and means for connecting the input of said filter amplifier circuit selectively across said first metering impedance or said third metering impedance.

12. A transistor test circuit comprising first, second and third connector means adapted to be connected to the emitter, base and collector, respectively, of the transistor to be tested, a first metering impedance connected at a first end to said third connector means, a source of oscillatory signal for providing signals at a first frequency, a second metering impedance connected in series with said oscillatory signal source to form a first series circuit, means connecting a first end of said first series circuit to said first connector means, first switch means connecting the second end of said first series circuit to said second connector means, a second series circuit including a third metering impedance and a source of direct potential, second switch means connecting a first end of said second series circuit selectively to said first end of said first series circuit or to said second connector means, third switch means connecting the second end of said second series circuit selectively to said first end of said first series circuit or to the second end of said first metering impedance, a first metering circuit substantially non-responsive to signals at said first frequency for measuring the amplitude of signal components appearing across said first and second metering impedances which are at a frequency equal to a multiple of said first frequency, and a second metering circuit for indicating the magnitude of the direct current flowing through said third metering impedance.

13. A transistor test circuit in accordance with claim 12, said test circuit further comprising a direct current meter, means for placing said meter in series with said second series circuit and means for disconnecting said first connector means from said first end of said first series circuit.

References Cited in the file of this patent

UNITED STATES PATENTS

| | | |
|---|---|---|
| 2,782,366 | Wall | Feb. 19, 1957 |
| 2,873,424 | Lowery | Feb. 10, 1959 |
| 2,907,954 | Radcliffe | Oct. 6, 1959 |
| 2,922,954 | Bigelow | Jan. 26, 1960 |
| 2,929,990 | Maurer | Mar. 22, 1960 |
| 2,942,182 | Kramer | June 21, 1960 |
| 2,977,534 | Hermansdorfer et al. | Mar. 28, 1961 |

OTHER REFERENCES

"Transistor Tester," Bulletin 124, Sierra Electronic Corporation, 3885 Bohannon Drive, Menlo Park, California (date unknown).

Hendrick: "Electronics," August 1, 1957; pages 174–176.

Hempel: "Electronics Industries," February 1958; pages 58–61.

"A Transistor D.C.-A.C. Beta Tester," article in Electronic Industries, October 1958; pages 90–91.

"Transistor Tester," article in Instruments and Control Systems, September 1959; pages 1314–1315.